US008260297B2

(12) United States Patent
Jeong et al.

(10) Patent No.: US 8,260,297 B2
(45) Date of Patent: Sep. 4, 2012

(54) METHOD AND APPARATUS FOR PERFORMING UPLINK TIMING SYNCHRONIZATION PROCEDURE UPON HANDOVER IN A MOBILE COMMUNICATION SYSTEM

(75) Inventors: Kyeong-In Jeong, Hwaseong-si (KR); Sung-Ho Choi, Suwon-si (KR); Ju-Ho Lee, Suwon-si (KR); O-Sok Song, Suwon-si (KR); Gert-Jan Van Lieshout, Middlesex (GB); Himke Van Dervelde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 1011 days.

(21) Appl. No.: 11/704,422

(22) Filed: Feb. 9, 2007

(65) Prior Publication Data
US 2007/0275723 A1    Nov. 29, 2007

(30) Foreign Application Priority Data

Feb. 9, 2006   (KR) .................. 10-2006-0012676

(51) Int. Cl.
*H04W 36/00* (2009.01)

(52) U.S. Cl. ........ 455/436; 455/502; 455/438; 455/440; 370/331; 370/332; 370/350; 370/324

(58) Field of Classification Search .......... 455/436, 455/438, 440, 502; 370/324, 331, 332, 350
See application file for complete search history.

(56) References Cited

U.S. PATENT DOCUMENTS

| 6,256,304 | B1 * | 7/2001 | Vayrynen ............... 370/350 |
| 6,519,457 | B1 | 2/2003 | Jiang et al. |
| 6,668,170 | B2 | 12/2003 | Costa et al. |
| 6,996,079 | B1 | 2/2006 | Bergenwall et al. |
| 2002/0032030 | A1 | 3/2002 | Berglund et al. |
| 2002/0045451 | A1 * | 4/2002 | Hwang et al. .............. 455/442 |
| 2002/0049057 | A1 * | 4/2002 | Moulsley et al. .......... 455/436 |
| 2003/0171118 | A1 | 9/2003 | Miya |
| 2004/0248575 | A1 * | 12/2004 | Rajala et al. ............... 455/436 |
| 2005/0124344 | A1 * | 6/2005 | Laroia et al. ............... 455/436 |
| 2005/0272426 | A1 | 12/2005 | Yang et al. |

FOREIGN PATENT DOCUMENTS

| CN | 1465203 | 12/2003 |
| EP | 0 676 908 | 11/1995 |
| EP | 1 605 723 | 12/2005 |
| GB | 2 318 258 | 4/1998 |

(Continued)

OTHER PUBLICATIONS

Nokia; Intra-radio Access Mobility, Handover in LTE_ACTIVE; Jan. 9-13, 2006; pp. 1-3.

(Continued)

*Primary Examiner* — Patrick Edouard
*Assistant Examiner* — Shantell L Heiber
(74) *Attorney, Agent, or Firm* — The Farrell Law Firm, P.C.

(57) ABSTRACT

An efficient uplink timing synchronization procedure performed with a target cell upon handover of a User Equipment (UE) in active mode in a mobile communication system is provided, in which a cell transmitter signals to the UE that the uplink timing synchronization procedure is not required in the target cell, and the UE carries out uplink transmission to the target cell at an uplink timing used in a source cell without the uplink timing synchronization procedure.

24 Claims, 6 Drawing Sheets

FOREIGN PATENT DOCUMENTS

| | | |
|---|---|---|
| KR | 1020030003464 | 1/2003 |
| KR | 1020030058685 | 7/2003 |
| KR | 1020050085634 | 8/2005 |
| RU | 2 242 091 | 12/2004 |
| WO | WO 98/03030 | 1/1998 |
| WO | WO 01/15345 | 3/2001 |
| WO | WO 02/073870 | 9/2002 |
| WO | WO 2005/062633 | 7/2005 |
| WO | WO 2005/117289 | 12/2005 |

OTHER PUBLICATIONS

Samsung; UL Timing Sync Procedure; Mar. 27-31, 2006; pp. 1-4.

* cited by examiner

METHOD AND APPARATUS FOR PERFORMING UPLINK TIMING SYNCHRONIZATION PROCEDURE UPON HANDOVER IN A MOBILE COMMUNICATION SYSTEM

This application claims priority under 35 U.S.C. §119(a) of a Korean Patent Application filed in the Korean Intellectual Property Office on Feb. 9, 2006 and assigned Serial No. 2006-12676, the entire disclosure of which is incorporated herein by reference.

BACKGROUND OF THE INVENTION

1. Field of the Invention

The present invention generally relates to handover implementation in a mobile communication system. More particularly, the present invention relates to a method and apparatus for performing an uplink timing synchronization procedure (UL timing sync procedure) in a User Equipment (UE), upon handover to a target cell.

2. Description of the Related Art

Multiple access schemes are used in wireless communication systems. Among the principal multiple access schemes are Time Division Multiple Access (TDMA), Code Division Multiple Access (CDMA), and Orthogonal Frequency Division Multiplexing (OFDM). OFDM is a special case of MultiCarrier Modulation (MCM) in which a serial symbol sequence is converted to parallel symbol sequences and modulated to multiple orthogonal subcarriers (or subcarrier channels), prior to transmission.

As a substitute for a 3G mobile communication standard, Universal Mobile Telecommunication System (UMTS), a $3^{rd}$ Generation Partnership Project (3GPP) Long Term Evolution (LTE), a major OFDM system, is a future-generation mobile communication system under discussion in the 3GPP standardization body.

FIG. 1 illustrates the configuration of a 3GPP LTE system.

Referring to FIG. 1, a UE 110 is a 3GPP LTE terminal. An Evolved-Radio Access Network (E-RAN) 140 performs the functionalities of a Node B and a Radio Network Controller (RNC) of the conventional 3GPP system. Node B is a radio device that directly participates in communications with a UE and manages cells. The RNC controls a plurality of Node Bs and radio resources.

As with the conventional 3GPP system where Node B and RNC are configured as separate nodes, E-RAN 140 can be configured as separate physical nodes, Evolved-Node B (E-Node B or E-NB) 120 and Evolved-RNC (E-RNC) 130, or can merge E-NB 120 and E-RNC 130 therein. E-NB 120 and E-RNC 130 are physically merged into the E-RAN 140. Yet, the following description also holds true in the former case.

An Evolved-Core Network (E-CN) 150 can be a node combining a Serving General Packet Radio Service (GPRS) Support Node (SGSN) and a Gateway GPRS Support Node (GGSN) of the conventional 3GPP system. E-CN 150, which is located between a Packet Data Network (PDN) 160 and E-RAN 140, allocates an Internet Protocol (IP) address to UE 110 and functions as a gateway that connects UE 110 to PDN 160.

FIG. 2 is a UL timing sync procedure in the 3GPP LTE system.

Referring to FIG. 2, a first UE (UE 1) is relatively near an E-NB and a second UE (UE 2) is relatively remote from the E-NB.

T_pro1 denotes the propagation delay time of radio transmission from the E-NB to UE 1, and T_pro2 denotes the propagation delay time of radio transmission from the E-NB to UE 2. Because UE 1 is nearer the E-NB than UE 2, T_pro1 is shorter than T_pro2. In the illustrated case of FIG. 2, it is assumed that T_pro1 and T_pro2 are 0.333 µs and 3.33 µs, respectively.

When UE 1 and UE 2 are at different distances from the E-NB but within the cell of the E-NB and UE 1 and UE 2 are powered-on or placed in idle mode, there may be a mismatch among the uplink timing of UE 1, the uplink timing of UE 2, and the uplink timings of UEs within the cell that the E-NB detects. UL@UE#1 201 denotes the uplink transmission timing of an OFDM symbol from UE 1, and UL@UE#2 202 denotes the uplink transmission timing of an OFDM symbol from UE 2. A timing gap or delay exists between UL@UE#1 and UL@UE#2.

The E-NB receives the OFDM symbols UL Frame@EN-B, at timings 212 and 213, with the propagation time delays of uplink transmission from UE 1 and UE 2 as shown. Specifically, the uplink symbol transmitted at the uplink timing UL@UE#1 from UE 1 arrives at E-NB at the timing UL Frame@E-NB 212 and an uplink symbol transmitted at the uplink timing UL@UE#2 from UE 2 arrives at E-NB at the timing UL Frame@E-NB 213. Since UE 1 and UE 2 are not yet synchronized, the timing of starting to decode uplink OFDM symbols, UL Frame@E-NB 211 in the E-NB, the timing of receiving the OFDM symbol from UE 1, UL Frame@E-NB 212, and the timing of receiving the OFDM symbol from UE 2, UL Frame@E-NB 213 are not aligned. Orthogonality is not kept between the uplink symbols from UE 1 and UE2, resulting in mutual interference. The interference and timing discrepancies make it difficult for the E-NB to successfully decode the uplink symbols received from UE 1 and UE 2.

UL timing synchronization is a process of synchronizing uplink timings among UE 1, UE 2 and E-NB. Therefore, when the UL timing synchronization is acquired, the decoding timing, the reception timing from UE 1, and the reception timing from UE 2 are all aligned, as denoted by reference numerals 215, 216 and 217. Thus, the E-NB can succeed in decoding the uplink symbols received from UE 1 and UE 2.

A description will be made below of a UL timing sync procedure among a UE in active mode, a source E-NB that controls a source cell before handover, and a target E-NB that controls a target cell in the LTE system.

Active mode is a mode in which a Radio Resource Control (RRC) connection is kept between a UE and an E-NB. The E-NB can transmit and receive service data to and from the UE as well as signaling for the UE in the active mode. The UE transmits and receives data to and from the E-NB using time resources and radio resources (e.g. frequency) allocated by scheduling information from the E-NB. Handover is a process of enabling the UE to continue receiving on-going dedicated data/signaling when it moves from one cell to another in the active mode.

FIG. 3 is a signal flow diagram for a UL timing sync procedure among a UE in active-mode, a source E-NB, and a target E-NB, upon handover.

Referring to FIG. 3, a UE 301 located in a source cell under control of a source E-NB 302 sends a MEASUREMENT REPORT message to the source E-NB 302 in step 311. The source cell is a cell in which UE 301 is located and which serves UE 301 before handover, and source E-NB 302 controls the source cell. A target cell is a cell to which UE 301 is to move by handover, and a target E-NB 303 controls the target cell. The MEASUREMENT REPORT message notifies the network of radio measurements about the serving cell and neighbor cells to support handover.

By the MEASUREMENT REPORT, UE 301 informs source E-NB 302 that a neighboring cell (i.e. a target cell) in a better radio channel environment than the serving cell (i.e. the source cell) has been discovered. Source E-NB 302 then decides to hand UE 301 over to the target cell based on the information included in the MEASUREMENT REPORT message.

In step 313, a handover procedure is performed between source E-NB 302 and target E-NB 303 to support the handover from the source cell to the target cell. The handover procedure may involve reservation of radio resources for UE 301 in the target cell, allocation of a UE Identification (ID) for use in the target cell, forwarding of a UE context and a service context associated with UE 301 from source E-NB 302 to target E-NB 303, and setup of a data transmission path between source E-NB 302 and target E-NB 303.

When the network has completely prepared for the handover, source E-NB 302 sends a HANDOVER COMMAND message to UE 301, commanding UE 301 to move to the target cell in step 315. The HANDOVER COMMAND message may provide UE 301 with information about the configuration of a radio channel to be used in the target cell.

Upon receipt of the HANDOVER COMMAND message, UE 301 selects a preamble code for use in a UL timing sync procedure with the target cell in step 321. The preamble code is a bit sequence of a predetermined pattern. Preamble code patterns are preset between UE 301 and target E-NB 303 for use in the UL timing sync procedure. UE 301 selects one of the preamble code patterns.

UE 301 sends a UL SYNC REQ message including the selected preamble code to target E-NB 303 in step 323. Target E-NB 303 can find out by the preamble code how far the uplink transmission timing of UE 301 is from the uplink reception timing of target E-NB 303. Hence, target E-NB 303 calculates timing adjustment information (referred to as timing adjustment info) to match the uplink transmission timing of UE 301 to the uplink reception timing of target E-NB 303.

In step 325, target E-NB 303 replies to UE 301 with a UL SYNC RES message on the downlink. The UL SYNC RES message includes the timing adjustment info and a preamble code ID. The preamble code ID identifies that the UL SYNC RES message is a response for the UL SYNC REQ message sent from UE 301.

UE 301 adjusts the uplink transmission timing based on the timing adjustment info included in the UL SYNC RES message in step 331 and sends a UL SYNC REQ message including a preamble code to the target E-NB 303 in step 333. This preamble code may have a different pattern from that of the preamble code sent in step 323.

In step 335, the target E-NB 303 replies with a UL SYNC RES message including timing adjustment info and a preamble code ID.

The procedure for adjusting the uplink transmission timing of UE 301 by transmitting and receiving preamble codes between UE 301 and target E-NB 303 can be repeated until UE 301 acquires the UL timing synchronization.

Upon acquisition of the UL timing synchronization, in other words, if the timing adjustment info included in the UL SYNC RES message in step 335 is made inactive (e.g. 0), UE 301 can send uplink signaling/data to target E-NB 303 in step 341. For example, a HANDOVER COMPLETE message can be sent to target E-NB 303, notifying successful completion of the handover to the target cell in step 341.

As described above with reference to FIG. 3, the UL timing sync procedure performed in the target cell upon handover to the target cell creates uplink/downlink signaling overhead and causes a service delay until the UE starts to send uplink signaling/data in the target cell in the conventional mobile communication system.

SUMMARY OF THE INVENTION

An aspect of the present invention is to address at least the above problems and/or disadvantages and to provide at least the advantages described below. Accordingly, an aspect of the present invention is to provide a method and apparatus for implementing handover to a target cell at a UE without performing an unnecessary UL timing sync procedure with a target cell in a mobile communication system.

Moreover, another aspect of the present invention provides a method and apparatus for indicating no need for an unnecessary UL timing sync procedure with a target cell to a UE, upon handover.

In accordance with an aspect of the present invention, there is provided a method for performing an uplink timing synchronization procedure upon handover at a UE in a mobile communication system, in which a handover command message indicating handover to a target cell is received from a Node B; it is determined from the handover command message whether the uplink timing synchronization procedure is required, if it is determined that the uplink timing synchronization procedure is not required at least one of uplink signaling and uplink data are sent to the target cell at an uplink timing of a source cell without performing the uplink timing synchronization procedure with the target cell after the handover to the target cell. If it is determined that the uplink timing synchronization procedure is required, uplink timing of the target cell is acquired by performing the uplink timing synchronization procedure with the target cell after the handover to the target cell and at least one of uplink signaling and uplink data are sent to the target cell at the uplink timing of the target cell.

In accordance with another aspect of the present invention, there is provided a method for performing an uplink timing synchronization procedure upon handover of a UE in a mobile communication system, in which it is determined to perform a handover procedure from a source cell to a target cell for the UE. It is determined whether the UE needs to perform the uplink timing synchronization procedure with the target cell. If the UE does not need to perform the uplink timing synchronization procedure with the target cell, a handover command message indicating no need for the uplink timing synchronization procedure is sent to the UE. If the UE needs to perform the uplink timing synchronization procedure with the target cell, a handover command message indicating a need for the uplink timing synchronization procedure is sent to the UE.

In accordance with a further aspect of the present invention, there is provided an apparatus for performing an uplink timing synchronization procedure upon handover in a mobile communication system. A control message receiver receives a handover command message indicating handover to a target cell from a Node B; an uplink synchronization controller determines from the handover command message whether the uplink timing synchronization procedure with the target cell is required, and if it is determined that the uplink timing synchronization procedure is not required, an uplink synchronization acquirer determines to send at least one of uplink signaling and uplink data to the target cell at an uplink timing of a source cell without performing the uplink timing synchronization procedure with the target cell after the handover to the target cell. If it is determined that the uplink timing synchronization procedure is required, the uplink synchronization acquirer determines to acquire an uplink timing of the target cell by performing the uplink timing synchronization procedure with the target cell after the handover to the target cell and send at least one of uplink signaling and uplink data to the target cell at the uplink timing of the target cell.

In accordance with still another aspect of the present invention, there is provided an apparatus of a Node B for performing an uplink timing synchronization procedure upon handover of a UE in a mobile communication system. A handover decider and controller determines to perform a handover procedure from a source cell to a target cell for the UE, an uplink synchronization decider determines whether the UE needs to perform the uplink timing synchronization procedure with the target cell, and if the UE does not need to perform the uplink timing synchronization procedure with the target cell, a control message transmitter sends a handover command message indicating no need for the uplink timing synchronization procedure to the UE, and sends a handover command message indicating a need for the uplink timing synchronization procedure to the UE, if the UE needs to perform the uplink timing synchronization procedure with the target cell.

BRIEF DESCRIPTION OF THE DRAWINGS

The above and other objects, features and advantages of the preferred embodiments of the present invention will be more apparent from the following detailed description taken in conjunction with the accompanying drawings, in which.

DETAILED DESCRIPTION OF PREFERRED EMBODIMENTS

The matters defined in the description such as a detailed construction and elements are provided to assist in a comprehensive understanding of the preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Preferred embodiments of the present invention provide a handover procedure that minimizes the time delay involved in a UL timing sync procedure performed in a target cell, upon handover. While the following description is made in the context of an OFDM system based on UMTS, 3GPP LTE, it is to be appreciated that the present invention is applicable to other mobile communication systems with a similar technological background and channel appreciated that the present invention is applicable to other mobile communication systems with a similar technological background and channel configuration.

Figure 1:
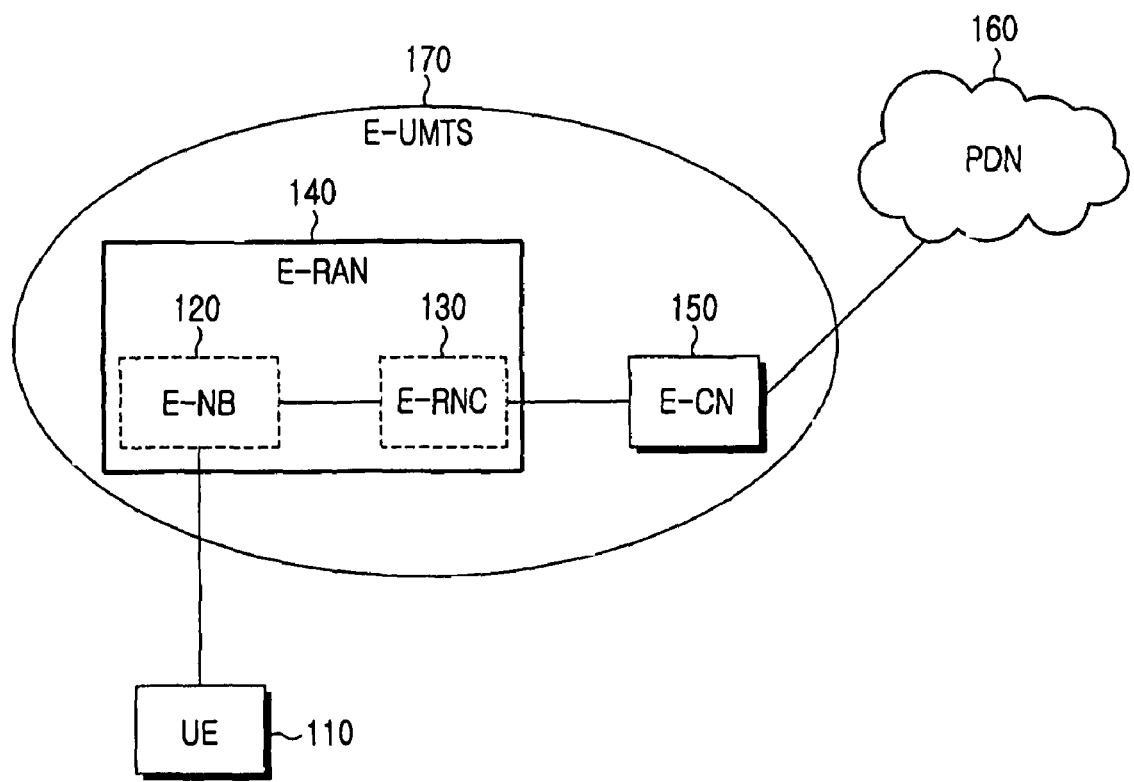
FIG. 1 illustrates the configuration of a 3GPP LTE system.
Figure 2:
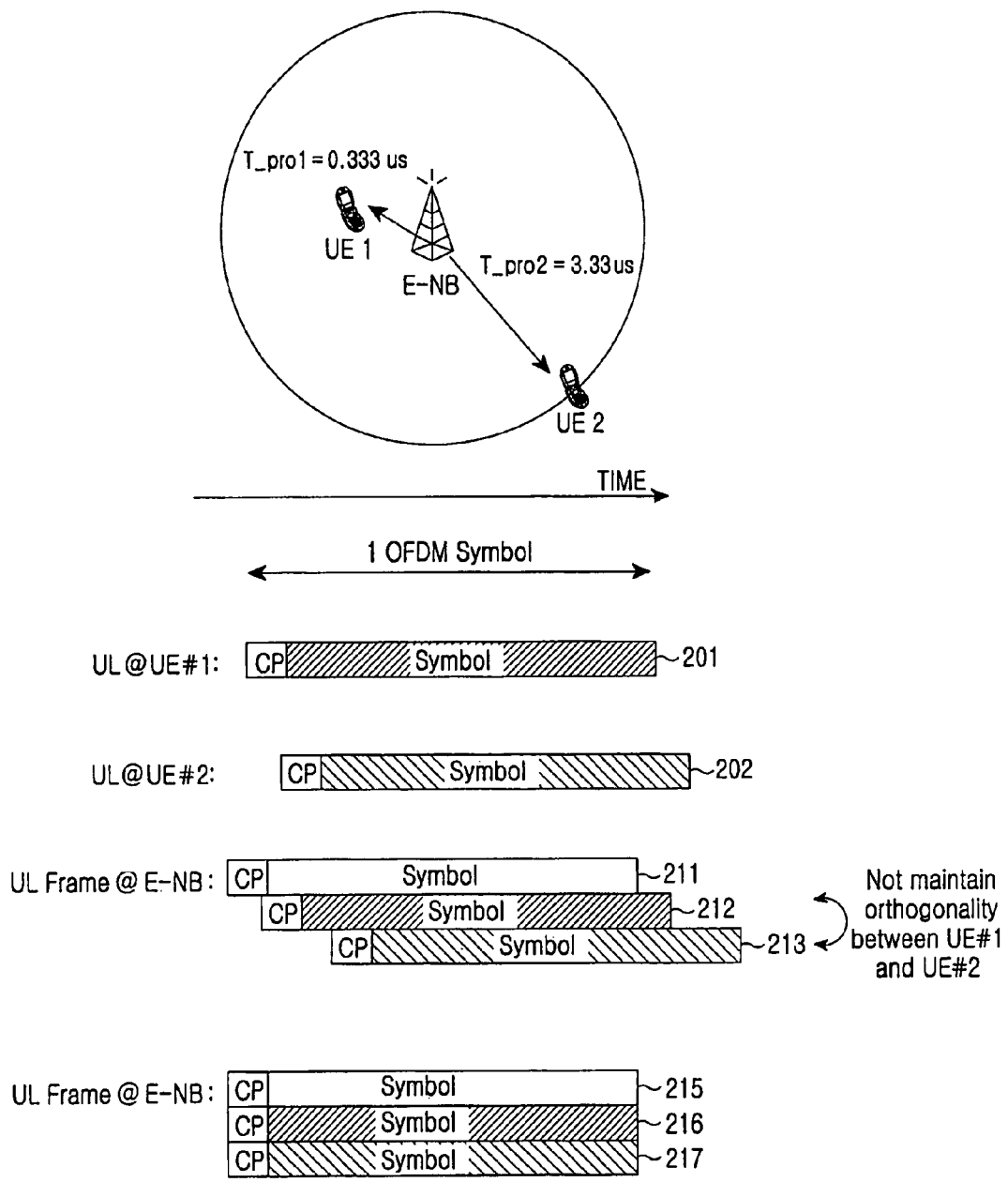
FIG. 2 is a UL timing sync procedure in the 3GPP LTE system.
Figure 3:
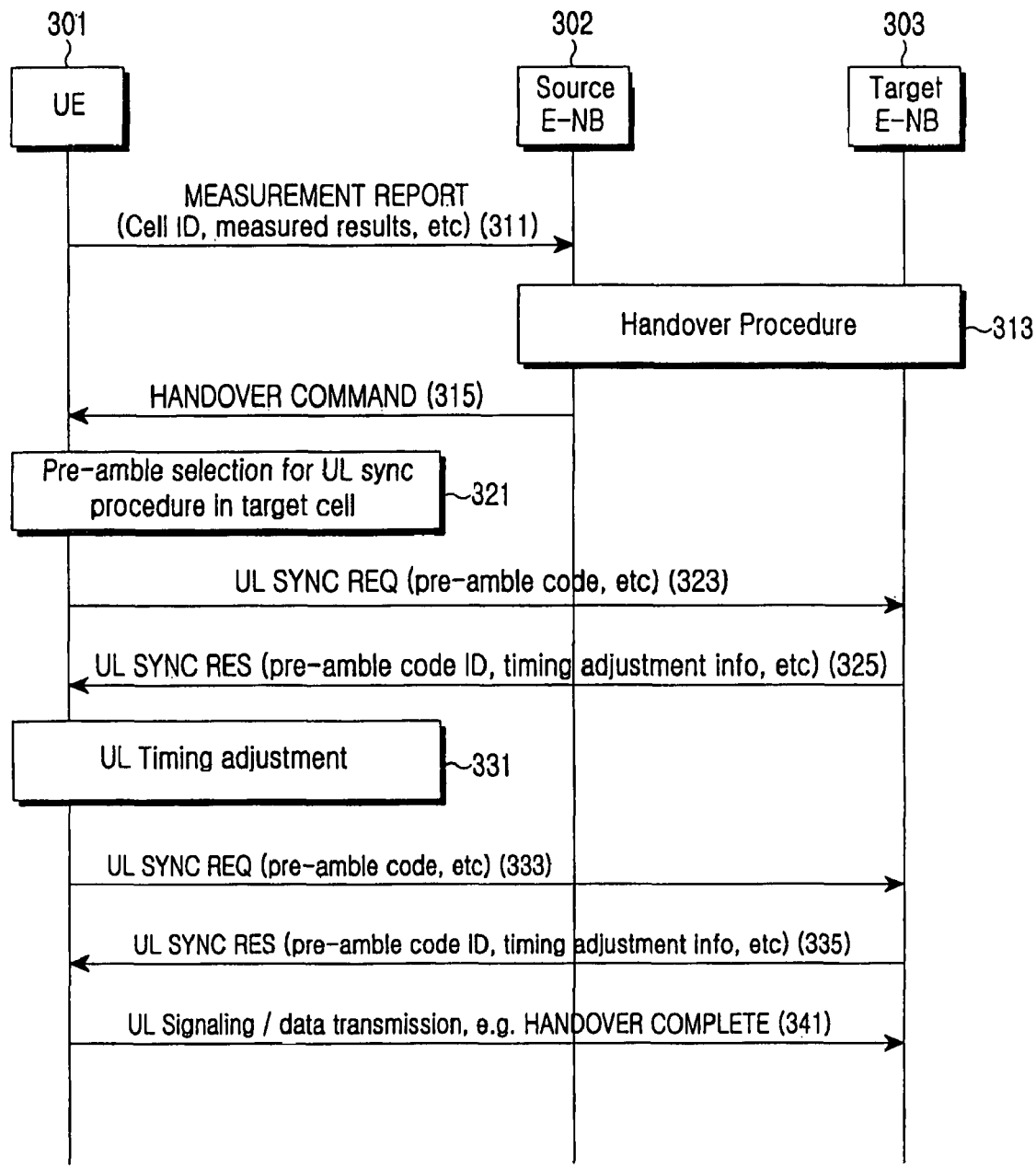
FIG. 3 is a signal flow diagram for the UL timing sync procedure with a target cell, upon handover.
Figure 4:
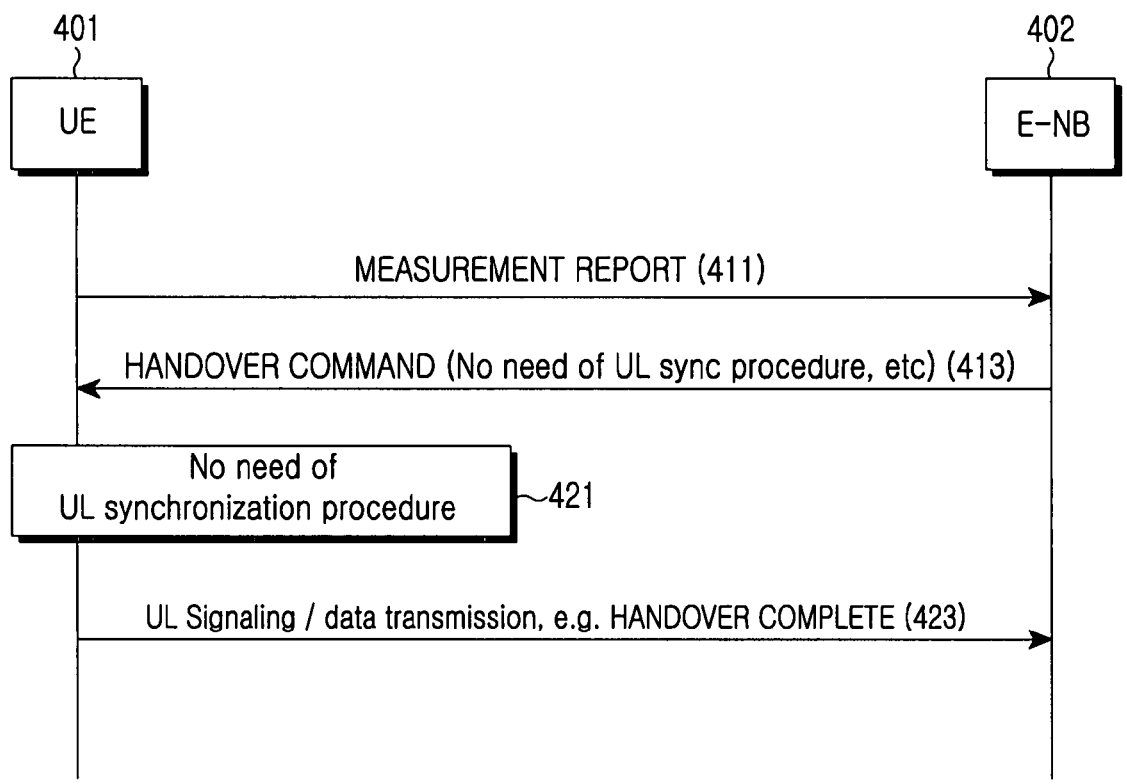
FIG. 4 is a signal flow diagram of a UL timing sync procedure with a target cell, upon handover according to the present invention.

Referring to FIG. 4, in active mode, a UE 401 sends a MEASUREMENT REPORT message including radio measurements about a source cell and neighboring cells to a source E-NB 402 that controls the source cell in step 411. For example, upon detection of at least one neighboring cell in a better radio channel environment than the source cell, UE 401 sends radio measurements about the source cell and the neighboring cell in the MEASUREMENT REPORT message. For another example, UE 401 informs source E-NB 402 that a neighboring cell (i.e. a target cell) in a better radio channel environment than the source cell has been discovered by the MEASUREMENT message.

E-NB 402 then decides to hand UE 301 over to the target cell being one of neighboring cells included in the MEASUREMENT REPORT message and a handover procedure is performed between the source cell and the target cell. The handover procedure may involve reservation of radio resources to be used for UE 401 in the target cell, allocation of a UE ID to be used in the target cell, forwarding of a UE context and a service context associated with UE 401 from source E-NB 402 to a target E-NB, and setup of a data transmission path between source E-NB 402 to the target E-NB.

When the handover procedure is completed, E-NB 402 sends a HANDOVER COMMAND message to UE 401, commanding UE 401 to move to the target cell in step 413. The HANDOVER COMMAND message may provide UE 401 with information about the configuration of a radio channel to be used in the target cell and other handover information.

Especially the HANDOVER COMMAND message includes an indicator indicating "no need for UL timing sync procedure" in the target cell. The message "no need for UL timing sync procedure" is sent to UE 401 by setting the explicit indicator in the HANDOVER COMMAND message or by the HANDOVER COMMAND message in an implicit rule.

In the absence of the indicator in the HANDOVER COMMAND message, UE 401 performs the UL timing sync procedure with the target cell in the manner described in FIG. 4. If the timings of the source cell and the target cell are identical or almost identical, the UL timing sync procedure before initial transmission of uplink signaling/data from UE 401 in the target cell increases service delay and causes unnecessary uplink/downlink signaling overhead. To avert these problems, E-NB 402 determines whether UE 401 needs to perform the UL timing sync procedure with the target cell, when it decides to handover UE 401 to the target cell. If the UL timing sync procedure is not required, E-NB 402 includes the indicator in the HANDOVER COMMAND message.

In the following scenarios, the UL timing sync procedure with the target cell is not required after handover.

1) The target cell and the source cell are managed by the same E-NB (i.e. inter-E-NB handover) and thus the E-NB receives uplink symbols from the source cell and the target cell at the same timing.

2) Even though the source cell and the target cell are managed by different E-NBs, the uplink reception timings from the source cell and the target cell are virtually identical as their difference is below a predetermined threshold.

In the above scenarios, E-NB 402 sends the indicator to UE 401, notifying that the UL timing sync procedure is not required in the target cell, upon handover to the target cell in active mode.

In step 421, UE 401 does not perform the UL timing sync procedure in the target cell according to the indicator, considering that the uplink timing in the source cell can be maintained also in the target cell. Without the unnecessary UL timing sync procedure, therefore, an unnecessary service delay is reduced and signaling overhead and/or radio resource consumption are avoided.

As an example of explicitly indicating that the UL timing sync procedure is not needed, E-NB 402 includes a one-bit indicator indicating "no need for UL timing sync procedure" in the HANDOVER COMMAND message in step 413. When detecting the indicator from the HANDOVER COMMAND message, the UE determines not to perform the UL timing sync procedure in the target cell.

Alternatively, E-NB 402 instructs UE 402 not to perform the UL timing sync procedure upon handover by an implicit rule rather than by the HANDOVER COMMAND message with explicit information such as the indicator. An example of the implicit rule is to use system information broadcast within a cell. When UE 401 finds out from system information broadcast from the source cell that the target cell indicated by the HANDOVER COMMAND message and the source cell are under control of the same E-NB, it determines to maintain the uplink timing of the source cell in the target cell rather than to perform the UL timing sync procedure.

Another example of the implicit rule is to use the radio channel configuration information typically included in the HANDOVER COMMAND message. The HANDOVER COMMAND message contains parameters by which UE 401 performs the UL timing sync procedure in the target cell. The parameters can be an initial uplink transmission timing in the target cell, an uplink timing difference between the source cell and the target cell, a preamble code, and information about the configuration of a radio channel to deliver the preamble code, for use in the UL timing sync procedure in the target cell.

If these parameters are included in the HANDOVER COMMAND message, UE 401 performs the UL timing sync procedure using the parameters. On the other hand, if the HANDOVER COMMAND message does not include the parameters, UE 401 determines to maintain the uplink timing of the source cell in the target cell rather than to perform the UL timing sync procedure in the target cell.

A third example of the implicit rule is to use a particular one of the parameters associated with the UL timing sync procedure included in the HANDOVER COMMAND message. For example, if the uplink timing difference between the source cell and the target cell is included in the HANDOVER COMMAND message and is set to a predetermined value (e.g. 0), UE 401 determines to maintain the uplink timing of the source cell in the target cell rather than to perform the UL timing sync procedure in the target cell.

If UE 401 determines to maintain the uplink timing of the source cell in the target cell in step 421, it sends uplink signaling/data to the target cell at the uplink timing of the source cell, after the handover to the target cell in step 423. The uplink signaling/data, which can be a HANDOVER COMPLETE message indicating successful completion of the handover to the network. In the illustrated case of FIG. 4, the source cell and the target cell are under the same E-NB 402. Hence, E-NB 402 delivers the uplink signaling/data to the target cell. The uplink timing means system time information used for communications between UE 401 and the source cell, such as a system frame number.

The following description is made with the appreciation that whether the UL timing sync procedure with the target cell is required is indicated to the UE by explicit signaling; it is obvious that the present invention can also be implemented by other explicit methods or implicit rules.

Figure 5:
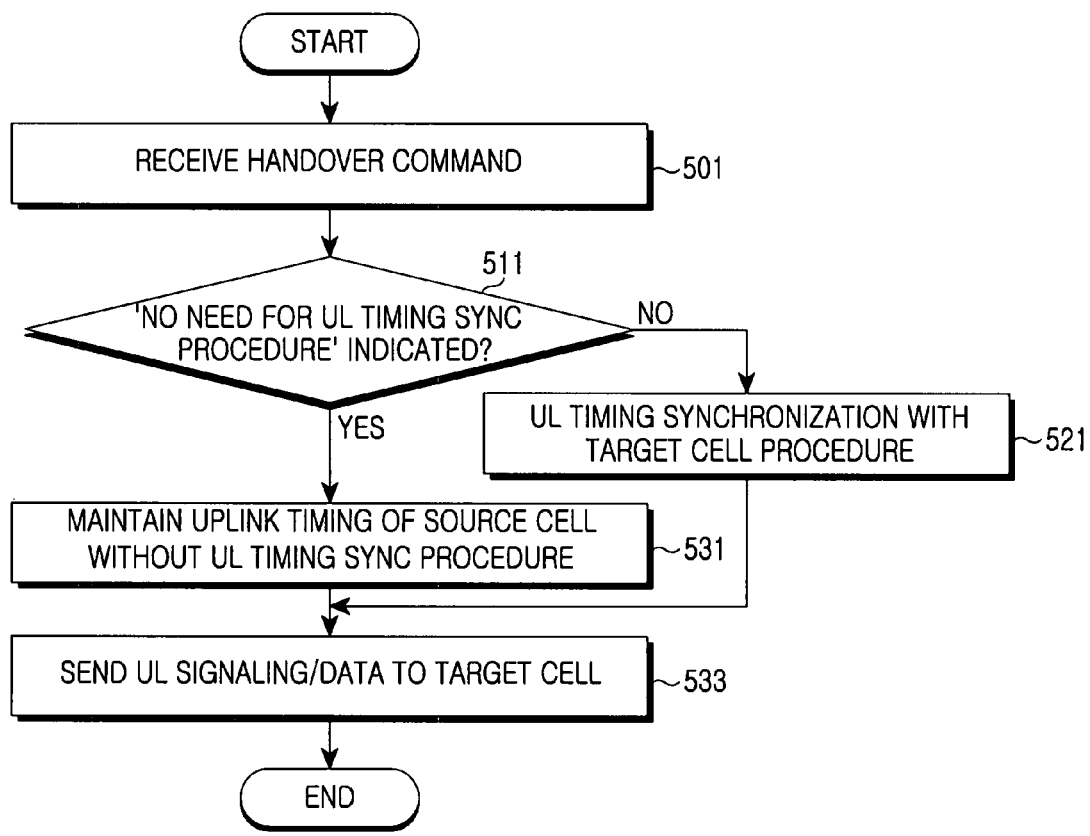
FIG. 5 is a flowchart of an operation of a UE according to the present invention.

Referring to FIG. 5, UE 401 receives a HANDOVER COMMAND message indicating handover to the target cell from E-NB 402 in step 501 and checks whether an indicator indicating "no need for UL timing sync procedure" is included in the HANDOVER COMMAND message in step 511. In the presence of the indicator, UE 401 maintains the uplink timing of the source cell without a UL timing sync procedure in the target cell in step 531 and sends uplink signaling/data to the target cell at the uplink timing of the source cell after the handover in step 533.

In the absence of the indicator, UE 401 acquires uplink timing synchronization to the target cell by the UL timing sync procedure in step 521 and sends uplink signaling/data to the target cell at the uplink timing of the source cell after the handover in step 533.

Figure 6:
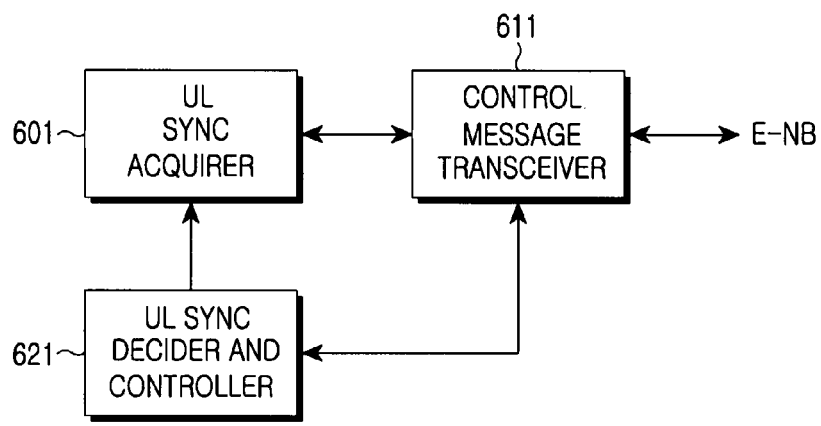
FIG. 6 is a block diagram of the UE according to the present invention.

Referring to FIG. 6, a UL sync acquirer 601 is activated or deactivated under the control of a UL sync controller 621. When the UL sync controller 621 decides that the UL timing sync procedure is not needed, the UL sync acquirer 691 does not perform the UL timing sync procedure. On the contrary, if UL sync controller 621 decides that the UL timing sync procedure is needed, UL sync acquirer 601 performs the UL timing sync procedure using parameters associated with the UL timing sync procedure, including a preamble code set by UL sync controller 621.

UL sync controller 621 makes a decision as to whether the UL timing sync procedure is required in the target cell depending on whether a HANDOVER COMMAND message received from E-NB 402 through a control message transceiver 611 includes an indicator indicating "no need for UL timing sync procedure". Specifically, upon receipt of the HANDOVER COMMAND message from E-NB 402 at the control message transceiver 611, UL sync controller 621 determines whether the HANDOVER COMMAND message includes the indicator.

In the presence of the indicator, UL sync controller 621 controls UL sync acquirer 601 not to perform the UL timing sync procedure with the target cell. In the absence of the indicator, UL sync controller 621 provides parameters associated with the UL timing sync procedure to UL sync acquirer 601 and controls the UL sync acquirer 601 to perform the UL timing sync procedure.

Control message transceiver 611 sends uplink signaling/data, particularly a HANDOVER COMPLETE message at uplink timing that the UL sync acquirer 601 tells E-NB 402.

Figure 7:
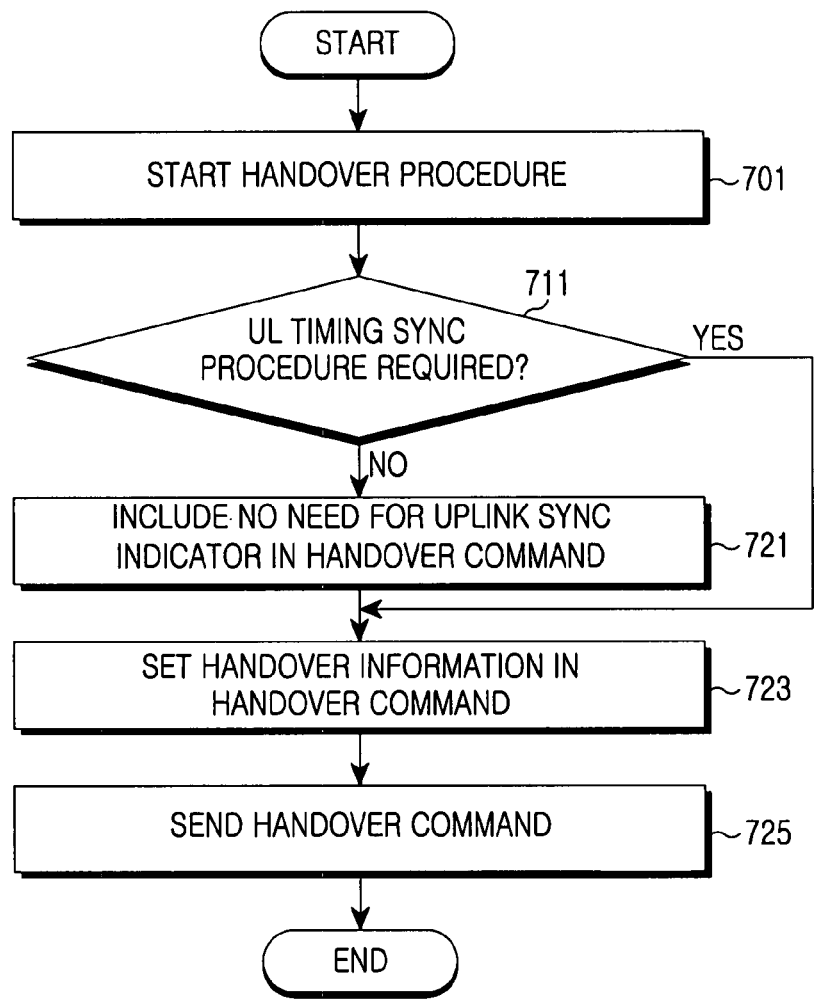
FIG. 7 is a flowchart of an operation of an E-NB according to the present invention.

Referring to FIG. 7, after receiving a MEASUREMENT REPORT message from UE 401, E-NB 402 starts a handover procedure in step 701. It can be further contemplated as another preferred embodiment of the present invention that the handover procedure is triggered by a factor such as the load balance of the network, other than the reception of the MEASUREMENT REPORT message from UE 401.

In step 711, E-NB 402 determines whether UE 401 needs to perform the UL timing sync procedure with the target cell, i.e. whether UE 401 has to adjust its uplink timing for communications with the target cell by the UL timing sync procedure or has to maintain the uplink timing of the source cell in the target cell without the UL timing sync procedure.

Determining that the UL timing sync procedure is not required, E-NB 402 includes an indicator indicating "no need for UL timing sync procedure" in a HANDOVER COMMAND message in step 721 and sets handover information in the HANDOVER COMMAND message in step 723. In step 725, E-NB 402 sends the HANDOVER COMMAND message to UE 401.

On the other hand, if determining that the UL timing sync procedure is to be performed in the target cell, E-NB 402 skips step 721 and includes sets handover information in the HANDOVER COMMAND message without the indicator in step 723. In step 725, E-NB 402 sends the HANDOVER COMMAND message to UE 401.

Figure 8:
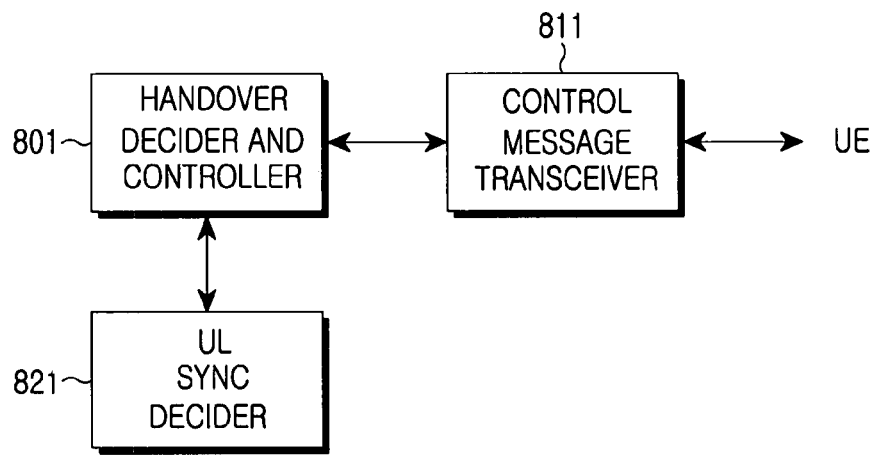
FIG. 8 is a block diagram of the E-NB according to the present invention.

Referring to FIG. 8, a handover decider and controller 801 is responsible for deciding or controlling handover for the UE. A UL sync decider 821 determines whether the UE needs to perform the UL timing sync procedure in the target cell, when handover to the target cell is decided. Specifically, UL sync decider 821 determines that the UL timing sync procedure is not required in the target cell, in the case where the target cell and the source cell are under the same E-NB or the uplink timings of the source cell and the target cell are virtually identical.

Handover decider and controller 801 sets handover-related parameters in a HANDOVER COMMAND message, and includes or does not include an indicator indicating "no need for UL timing sync procedure" in the HANDOVER COMMAND message depending on the decision result of UL sync decider 821. A control message transceiver 811 sends the HANDOVER COMMAND message to the UE, and sends a response message, if the UE has requested uplink synchronization. If the source cell and the target cell are under the same E-NB, control message transceiver 811 receives a HANDOVER COMPLETE message from the UE in response to the HANDOVER COMMAND message.

As is apparent from the above description, a UE is instructed not to perform an unnecessary UL timing sync procedure upon handover in the present invention. Therefore, unnecessary uplink/downlink signaling overhead after handover is prevented and a service delay until a UE starts to send uplink signaling/data is reduced.

While the invention has been shown and described with reference to certain preferred embodiments, it will be understood by those skilled in the art that various changes in form and details may be made therein without departing from the spirit and scope of the present invention as further defined by the appended claims and their equivalents.

What is claimed is:

1. A method for performing an uplink timing synchronization procedure upon handover at a User Equipment (UE) in a mobile communication system, comprising:
    receiving a handover command message indicating handover to a target cell and representing whether the uplink timing synchronization procedure is required in the target cell, from a Node B;
    determining from the handover command message if the uplink timing synchronization procedure is required by determining whether a difference between uplink timings of a source cell and the target cell, detected from the handover command message, is set to a predetermined value;
    sending at least one of uplink signaling and uplink data to the target cell at an uplink timing of the source cell without performing the uplink timing synchronization procedure with the target cell after the handover to the target cell, if it is determined that the uplink timing synchronization procedure is not required; and
    acquiring an uplink timing of the target cell by performing the uplink timing synchronization procedure with the target cell after the handover to the target cell, and sending at least one of uplink signaling and uplink data to the target cell at the uplink timing of the target cell, if it is determined that the uplink timing synchronization procedure is required.

2. The method of claim 1, wherein the determination step comprises determining whether the handover command message includes an indicator indicating no need for the uplink timing synchronization procedure with the target cell, and determining that the uplink timing synchronization procedure with the target cell is not required in the presence of the indicator in the handover command message.

3. The method of claim 1, wherein the determination step further comprises determining whether the target cell indicated by the handover command message and the source cell are under the same Node B, and determining that the uplink timing synchronization procedure with the target cell is not required, if the target cell and the source cell are under the same Node B.

4. The method of claim 1, wherein the determination step further comprises determining whether the handover command message includes parameters associated with the uplink timing synchronization procedure, and determining that the uplink timing synchronization procedure with the target cell is not required in the absence of the parameters in the handover command message.

5. The method of claim 1, wherein the uplink signaling sent to the target cell is a handover complete message indicating successful completion of the handover to the target cell.

6. A method for performing uplink timing synchronization procedure upon handover of a User Equipment (UE) in a mobile communication system, comprising:
    determining to perform a handover procedure from a source cell to a target cell for the UE;
    determining if the UE needs to perform the uplink timing synchronization procedure with the target cell;
    sending a handover command message indicating handover to the target cell and representing that the uplink timing synchronization procedure is not required in the target cell, to the UE, if the UE does not need to perform the uplink timing synchronization procedure with the target cell; and
    sending a handover command message indicating a need for the uplink timing synchronization procedure to the UE, if the UE needs to perform the uplink timing synchronization procedure with the target cell;
    wherein the handover command message includes a difference between uplink timings of the target cell and the source cell that is set to a predetermined value, when the UE does not need to perform the uplink timing synchronization procedure with the target cell.

7. The method of claim 6, wherein the determination as to whether the UE needs to perform the uplink timing synchronization procedure comprises determining that the UE does not need to perform the uplink timing synchronization procedure with the target cell, if the target cell and the source cell are under the same Node B.

8. The method of claim 6, wherein the determination as to whether the UE needs to perform the uplink timing synchronization procedure comprises determining that the UE does not need to perform the uplink timing synchronization procedure with the target cell, if the difference between uplink timings of the target cell and the source cell is below a threshold.

9. The method of claim 6, wherein the handover command message includes an indicator indicating no need for the uplink timing synchronization procedure to the UE, if the UE does not need to perform the uplink timing synchronization procedure with the target cell.

10. The method of claim 6, wherein the handover command message does not include parameters associated with the uplink timing synchronization procedure with the target cell, if the UE does not need to perform the uplink timing synchronization procedure with the target cell.

11. The method of claim 6, further comprising receiving a handover complete message indicating to the target cell successful completion of handover to the target cell from the UE.

12. A User Equipment (UE) apparatus for performing uplink timing synchronization procedure upon handover in a mobile communication system, comprising:
 a control message receiver for receiving a handover command message indicating handover to a target cell and representing whether the uplink timing synchronization procedure is required in the target cell, from a Node B;
 an uplink synchronization controller for determining from the handover command message if the uplink timing synchronization procedure with the target cell is required by determining whether a difference between uplink timings of a source cell and the target cell, detected from the handover command message, is set to a predetermined value; and
 an uplink synchronization acquirer for determining to send at least one of uplink signaling and uplink data to the target cell at an uplink timing of the source cell without performing the uplink timing synchronization procedure with the target cell after the handover to the target cell, if it is determined that the uplink timing synchronization procedure is not required.

13. The apparatus of claim 12, wherein the uplink synchronization acquirer determines to acquire an uplink timing of the target cell by performing the uplink timing synchronization procedure with the target cell after the handover to the target cell and send at least one of uplink signaling and uplink data to the target cell at the uplink timing of the target cell, if it is determined that the uplink timing synchronization procedure is required.

14. The apparatus of claim 12, wherein the uplink synchronization controller determines whether the handover command message includes an indicator indicating no need for the uplink timing synchronization procedure with the target cell, and determines that the uplink timing synchronization procedure with the target cell is not required, in the presence of the indicator in the handover command message.

15. The apparatus of claim 12, wherein the uplink synchronization controller further determines whether the target cell indicated by the handover command message and the source cell are under the same Node B.

16. The apparatus of claim 12, wherein the uplink synchronization controller further determines that the uplink timing synchronization procedure with the target cell is not required if the target cell and the source cell are under the same Node B.

17. The apparatus of claim 12, wherein the uplink synchronization controller determines whether the handover command message includes parameters associated with the uplink timing synchronization procedure, and in the absence of the parameters in the handover command message, determines that the uplink timing synchronization procedure with the target cell is not required.

18. The apparatus of claim 12, further comprising a control message transmitter for sending a handover complete message indicating successful completion of the handover to the target cell at one of the uplink timings of the source cell and the target cell provided by the uplink synchronization acquirer.

19. A Node B apparatus for performing uplink timing synchronization upon handover of a User Equipment (UE) in a mobile communication system, comprising:
 a handover decider and controller for determining to perform a handover procedure from a source cell to a target cell for the UE;
 an uplink synchronization decider for determining if the UE needs to perform the uplink timing synchronization procedure with the target cell; and
 a control message transmitter for sending a handover command message indicating handover to the target cell and representing that the uplink timing synchronization procedure is not required to the UE in the target cell, if the UE does not need to perform the uplink timing synchronization procedure with the target cell, and sending a handover command message indicating a need for the uplink timing synchronization procedure to the UE, if the UE needs to perform the uplink timing synchronization procedure with the target cell;
 wherein the handover command message includes a difference between uplink timings of the target cell and the source cell that is set to a predetermined value, when the UE does not need to perform the uplink timing synchronization procedure with the target cell.

20. The apparatus of claim 19, wherein the uplink synchronization decider determines that the UE does not need to perform the uplink timing synchronization procedure with the target cell, if the target cell and the source cell are under the same Node B.

21. The apparatus of claim 19, wherein the uplink synchronization decider determines that the UE does not need to perform the uplink timing synchronization procedure with the target cell, if the difference between uplink timings of the target cell and the source cell is below a threshold.

22. The apparatus of claim 19, wherein the handover command message includes an indicator indicating no need for the uplink timing synchronization procedure to the UE, if the UE does not need to perform the uplink timing synchronization procedure with the target cell.

23. The apparatus of claim 19, wherein the handover command message does not include parameters associated with the uplink timing synchronization procedure with the target cell, if the UE does not need to perform the uplink timing synchronization procedure with the target cell.

24. The apparatus of claim 19, further comprising a control message receiver for receiving a handover complete message indicating to the target cell successful completion of handover to the target cell from the UE.

* * * * *